United States Patent [19]
Abels et al.

[11] 4,189,025
[45] * Feb. 19, 1980

[54] HYDRAULIC-ACTUATED STEERING ASSEMBLY FOR AN INDUSTRIAL VEHICLE

[75] Inventors: Theodor Abels; Bernhard Götz, both of Aschaffenburg; Günter Honecker, Klein-Welzheim, all of Fed. Rep. of Germany

[73] Assignee: Linde Aktiengesellschaft, Höllriegelskreuth, Fed. Rep. of Germany

[*] Notice: The portion of the term of this patent subsequent to Jan. 22, 1997, has been disclaimed.

[21] Appl. No.: 836,851

[22] Filed: Sep. 26, 1977

[30] Foreign Application Priority Data
Sep. 24, 1976 [DE] Fed. Rep. of Germany ....... 2642905

[51] Int. Cl.² ............................................. B60D 5/06
[52] U.S. Cl. .................................................. 180/159
[58] Field of Search ............... 180/154, 155, 156, 157, 180/158, 159, 160

[56] References Cited
U.S. PATENT DOCUMENTS

| 3,480,100 | 11/1969 | Gaulke | 180/155 |
| 3,994,362 | 11/1976 | Penington | 180/156 |

FOREIGN PATENT DOCUMENTS 1,404,008  8/1975  United Kingdom ..................... 180/155

*Primary Examiner*—John A. Pekar
*Attorney, Agent, or Firm*—Karl F. Ross

[57] ABSTRACT

A hydraulically operated steering assembly for a floor-type industrial vehicle, such as a fork-lift truck, comprises an elongated axial body upon which the axle carriers for the respective wheel axles are mounted at its ends. The pivot axes between the knuckle and the axle body and between the hydraulic cylinder and the axle body coincide, i.e., the cylinder and the knuckle are pivoted coaxially on the body and preferably within the latter.

3 Claims, 4 Drawing Figures

HYDRAULIC-ACTUATED STEERING ASSEMBLY FOR AN INDUSTRIAL VEHICLE

CROSS REFERENCE TO RELATED APPLICATIONS

This application is related to the concurrently filed, commonly assigned copending applications Ser. No. 836,847 of Theodor Abels, Bernhard Gotz and Gunter Honecker, Ser. No. 836,849 of Gunter Honecker and Ser. No. 836,850 of Theodor Abels (now U.S. Pat. No. 4,137,990).

FIELD OF THE INVENTION

The present invention relates to improvements in hydraulically actuated steerable axle assemblies and, more particularly, to a steering-axle assembly for industrial floor-type vehicles, especially fork-lift trucks.

BACKGROUND OF THE INVENTION

Floor-type industrial vehicles, such as fork-lift trucks, are provided with steerable wheels in an axle assembly upon which the steering linkage is mounted and are required to have a relatively small turning radius to permit high maneuverability of the vehicle.

In prior art steering assemblies or linkages, the king pin angles require that the tie bar of the steering linkage be connected to the steering knuckle by ball joints to allow for the vertical movability of the tie bars during the steering operation.

For the most part, the knuckle was pivotally mounted above or below the axle body, usually below, while the hydraulic cylinder which controls the steering linkage was likewise displaced generally below this body and was connected pivotally to one axle carrier and to a location on the axle body or the vehicle frame or chassis at a location on the opposite side of the longitudinal vertical medium plane through the vehicle. This pivotal connection also generally required ball joints, especially when the hydraulic cylinder was pivotally connected to the vehicle frame or chassis to which the axle body was additionally affixed.

The numerous ball joints required in such systems had a tendency to deteriorate, and in general, maintenance was required to be frequent and was generally expensive.

Furthermore, the entire system was relatively large and frequently caused an unnecessary increase in the height of the vehicle chassis above the floor, limited the angular displacement of the steerable wheel and otherwise was less than satisfactory.

OBJECTS OF THE INVENTION

It is the principal object of the present invention, to provide an improved hydraulically actuated steering-axle assembly which avoids the disadvantages set forth above.

Another object of the invention is to provide a relatively small steering axle, especially for industrial floor vehicles, such as fork lift trucks, which can be manufactured at low cost, can be mounted simply upon the vehicle, which can be maintained infrequently at low cost, and which has improved operating characteristics and useful life.

Another object of the invention is to provide an improved steering axle assembly which can be readily assembled and disassembled and which is of relatively small height.

SUMMARY OF THE INVENTION

These objects, and others which will become apparent hereinafter, are attained in a compact-hydraulically controlled steering axle assembly which comprises an elongated axle body, with carriers for respective wheel axles, which are pivotted at the ends of this body. Centrally of the body there is pivoted according to the invention a steering knuckle which is linked to each of the axles connected by a respective tie bar, the tie bars being independently pivoted to the steering knuckle and being further pivoted to the respective axle carriers.

A hydraulic cylinder for the hydraulic actuation of the steering linkage is pivotally connected to the axle body coaxially with the knuckle in accordance with an essential feature of the invention and is further connected pivotally with one of the axle carriers.

Accordingly a particular feature of the invention, the hydraulic cylinder and the steering knuckle are pivotally mounted upon a common support element, preferably a common pivot pin.

Still another important feature of the invention resides in pivotally connecting each of the axle carriers to the housing for displacement about respective but mutually parallel axes which are, in turn, parallel to the axes of the aforementioned pin. All of the axes of the pivots described above can thus be mutually parallel in a preferred embodiment of the invention.

Most advantageously, the axle body is a housing of "C" cross-section defined by upper and lower substantially horizontal walls and closed at one side (front or rear) by a substantially vertical wall, the pin spanning the open side and the knuckle reaching toward the closed side of this housing. The cylinder and the tie bar are, at least in major part received within this housing.

BRIEF DESCRIPTION OF THE DRAWING

The above and other objects, features and advantages will become more readily apparent from the following description, reference being made to the accompanying drawing in which.

SPECIFIC DESCRIPTION

Figure 1:
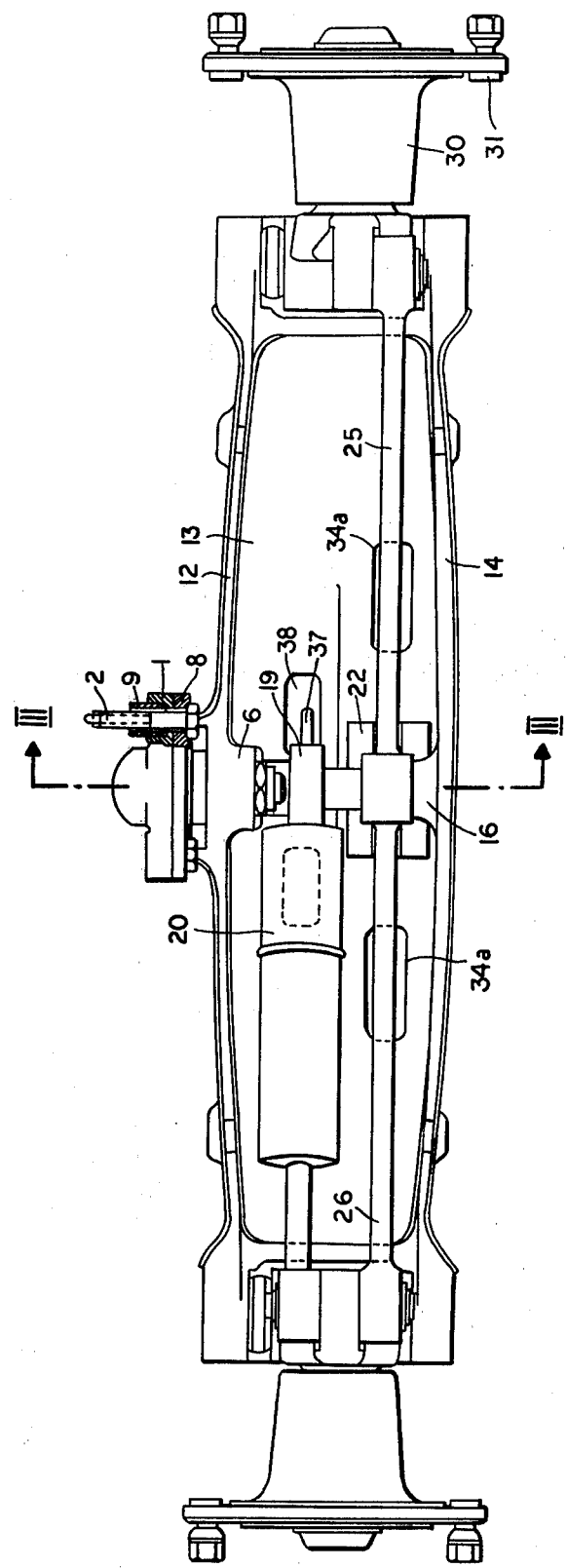
FIG. 1 is an elevational view of an axle assembly for the steerable wheels of a forklift truck as seen from the rear, partly broken away.

The axle assembly shown in FIGS. 1 through 4 is intended to be mounted upon the frame or chassis of a forklift truck or like industrial vehicle, the frame or chassis being unillustrated in the drawing.

More specifically, the axle assembly comprises a pair of mounting plates 1 which are intended to be affixed to the frame, not shown, of the vehicle. Each of the mounting plates 1 is formed with a ball-shaped receptacle 1a (see FIGS. 2 and 3) in which a ball head 3 is received. Each of the ball heads 3 has a pin which extends through a projection 5 or 6 of the axle housing and is fixed thereto by a nut 7.

To prevent the ball heads 3 from pulling out of the sockets 1a of the mounting plates 1, below these ball heads there are provided form-fitting securing plates 8 which pass the ball members with clearance and are affixed from below to the vehicle frame. Stressing sleeves 9 ensure a firm connection between members 1 and 8. An elastic ring is disposed between each of the plates 8 and the housing lugs 5 and 6 to form a seal around the balls 3 as shown at 10 in FIG. 3.

The axle housing, which is formed with the forward projection or lug 5 and the rearward projection or lug 6 previously mentioned is represented generally at 100 and comprises an upper horizontal wall 12, a rear wall 13 and a lower wall 14. One side of the housing is thus open at 100a.

The rear wall 13 is formed at its lower central portion with an outward bulge 13a. In the vertical median plane through the housing, corresponding to the plane of the section line III—III, the upper wall 12 is formed with a downwardly extending boss 15 while the bottom wall 14 is formed with an upwardly extending boss 16. These bosses 15 and 16 are formed with aligned bores 17 into which a pivot pin 18 is press fitted.

A pivot head 19 of a hydraulic cylinder 20, serving to displace the steering mechanism, is swingably mounted upon the pin 18.

Below the head 19, also upon this pin 18, there is provided a spacing sleeve 21 and below the spacing sleeve, the pivot head 22a of a steering knuckle or central member 22. Thus the element 18 constitutes a pin by which the knuckle 22 and the cylinder 20 are mounted in common on the axle housing or body and are coaxially pivoted thereon.

In the central member 22, by respective pivots 23 and 24, two tie bars 25 and 26 are mounted.

The tie bar 25 is pivotally connected by a pin 29 to an axle carrier 28a upon which the right hand axle 28 is affixed. The axle carrier 28a is pivotally connected by the pin 27 to the right hand end of the axle housing 100. The axle 28, in addition, carries the wheel hub 30 to which, by screws 31, the felly or rim of the right hand wheel can be affixed to this hub.

Similarly, the axle 32 carrying the hub 30 and the wheel bolts for the left hand wheel is mounted upon an axle carrier which is pivoted at 27 to the housing and is connected by a pivot bolt or pin 33 with the tie bar 26.

The bolt or pin 33 is made somewhat longer than the bolt of pin 29 to accommodate the pivot head of the rod 35 of the hydraulic cylinder 20. Thus the hydraulic cylinder 20 acts upon the carrier for the left hand wheel as can be seen from FIG. 2.

The working chamber on the piston rod side of this cylinder is connected via a line 36 which can be pressurized by any conventional steering control (not shown) for the forklift truck. The working chamber of the cylinder at the piston side is connected via a bore 36a with line 37 passing through a window 38 in the rear wall 13 of the axle housing 100.

The rear wall 13 is also formed with cutouts 34a to permit full displacement of the tie rods 25 and 26 and thus prevent these divided tie rod members from contacting the wall 13.

The axes of the pivot pins or bolts, 18, 23, 24, 27, 29, and 33 are all parallel to one another, generally perpendicular to the walls 12 and 14 and substantially parallel to the wall 13. They are also substantially perpendicular to the plane of the tie bars 25 and 26. None of the pivots 18, 23, 24, 27, 29, 33 need include a ball joint.

Figure 4:
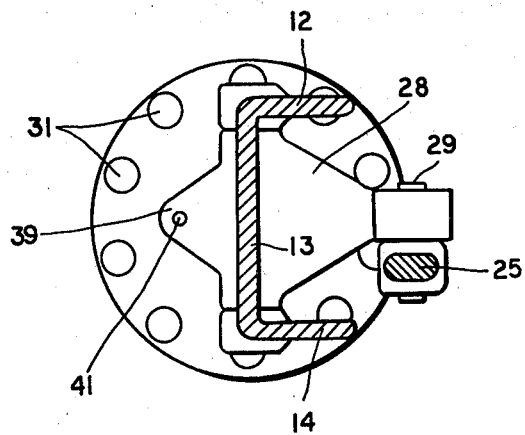
FIG. 4 is a cross-sectional view taken along the line IV—IV of FIG. 2.

As can be seen especially from FIG. 4, the tie bars 25 and 26 are of substantially rectangular cross section and constitute bodies of identical bending strength and stiffness. This has been found to be essential for effective utilization of the axle assembly of the present invention.

Each of the axle carrier 28a, 32a is provided with a projection 39 in which an adjusting screw 41 is threaded and locked in place by a counternut 40. The screw 41 sets the maximum angular displacement of the respective axle carriers about the pivots 27 and thus prevents the tires carried by the respective wheels from coming to rest against the rear wall 13 or, in the opposite direction, against the hydraulic cylinder 20.

Figure 2:
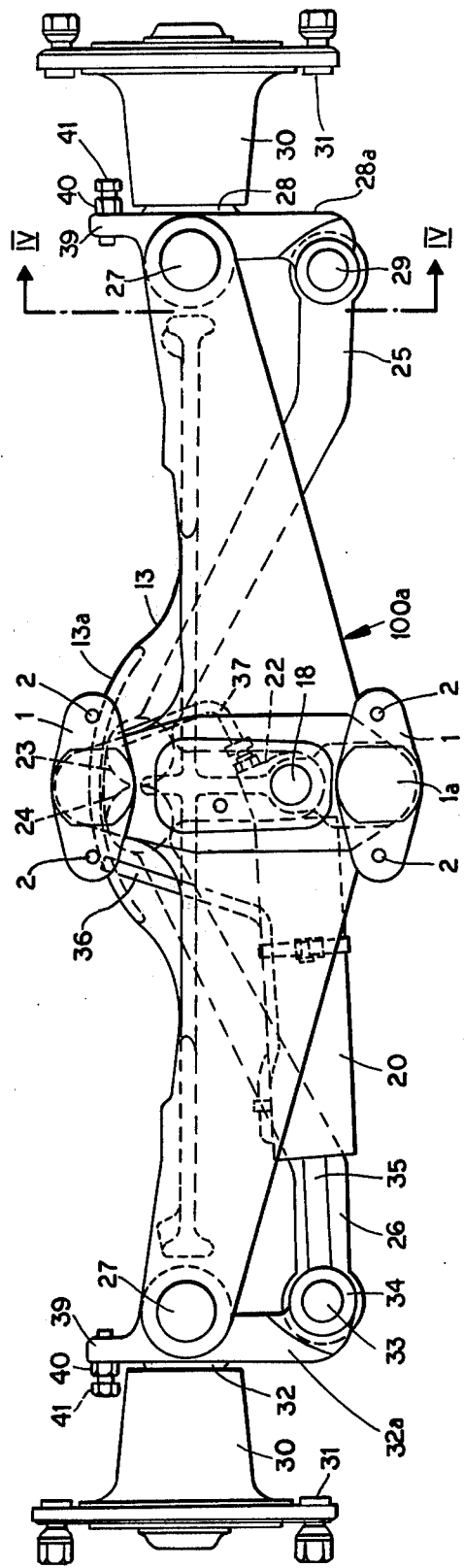
FIG. 2 is a plan view of the axle assembly.

It is important, as noted, that the members 25 and 26 have the same bending strength and stiffness in a plane corresponding to the plane of FIG. 2 and perpendicular to the plane of FIG. 1.

Figure 3:
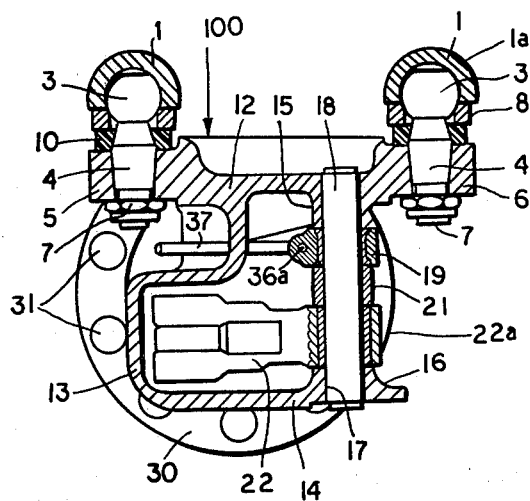
FIG. 3 is a cross-sectional view taken along the line III—III of FIG. 1.

As can be seen from FIGS. 2 and 3 of the drawing, the centers of the ball joints formed by the balls 3 lie in a vertical plane of the axis of the shaft or pin 18 and define a line which is perpendicular to this pin 18. Furthermore, the pin 18 forms a common element supporting the knuckle 22 and the head 19 at the end of the cylinder 20 so that the pivots for the cylinder and for the knuckle are coaxial.

I claim:

1. A steering axle assembly for an industrial floor-type vehicle such as a fork lift truck, comprising:
   an elongated axle body;
   respective axle carriers pivotally connected to said body at opposite ends thereof, each of said carriers being formed with an axle adapted to receive a vehicle wheel;
   a knuckle pivotally connected to said body;
   respective tie bars pivotally connected at respective locations to said knuckle and each pivotally connected to a respective one of said carriers;
   a hydraulic piston and cylinder pivotally connected to said body coaxial with the pivot connection of said knuckle thereon and operatively connected to one of said carriers for displacing said carriers, said tie bars and said knuckle; and
   a pivot pin on said body, said cylinder and said knuckle being pivotally mounted on said pin, the axes of the pivot connections between said carriers and said body being parallel to the axis of said pin.

2. A steering axle assembly for an industrial floor-type vehicle such as a fork lift truck, comprising:
   an elongated axle body;
   respective axle carriers pivotally connected to said body at opposite ends thereof, each of said carriers being formed with an axle adapted to receive a vehicle wheel;
   a knuckle pivotally connected to said body;
   respective tie bars pivotally connected at respective locations to said knuckle and each pivotally connected to a respective one of said carriers;
   a hydraulic piston and cylinder pivotally connected to said body coaxial with the pivot connection of said knuckle thereon and operatively connected to one of said carriers for displacing said carriers, said tie bars and said knuckle; and
   a pivot pin on said body, said cylinder and said knuckle being pivotally mounted on said pin, the axes of the pivot connections between said carriers and said body being parallel to the axis of said pin, the pivot connections between said tie bars and said knuckle and between said tie bars and the respective carrier having axes which are parallel to the axis of said pin, said body being formed as a generally C-section housing having upper and lower walls each formed with a boss reaching toward the other in a medium plane transverse to the longitudinal dimension of said housing, said pin being fitted into said bosses, said knuckle lying wholly within said housing and said tie bars and said cylinder lying at least in major part within said housing.

3. The assembly defined in claim 2 wherein said housing further comprises a substantially vertical wall formed with a bulge opposite said pin, said knuckle facing said bulge.

* * * * *